June 12, 1928.

G. F. HOBSON 1,673,788

PORTABLE BUILDING

Filed Oct. 1, 1924    8 Sheets-Sheet 2

June 12, 1928.  G. F. HOBSON  1,673,788
PORTABLE BUILDING
Filed Oct. 1, 1924  8 Sheets-Sheet 5

Inventor
George F. Hobson,
By Wm F. Roy Co. Attorney

June 12, 1928.  1,673,788
G. F. HOBSON
PORTABLE BUILDING
Filed Oct. 1, 1924     8 Sheets-Sheet 6
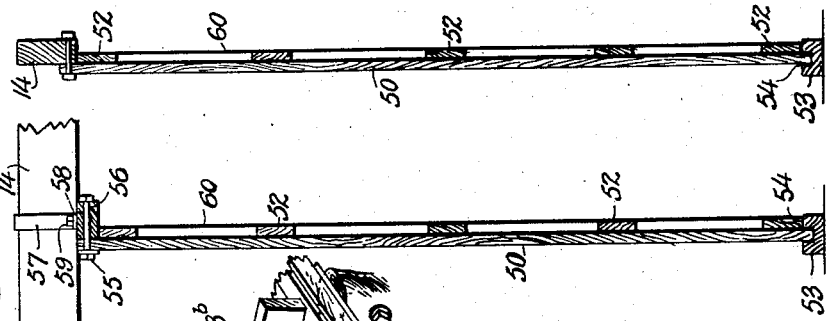
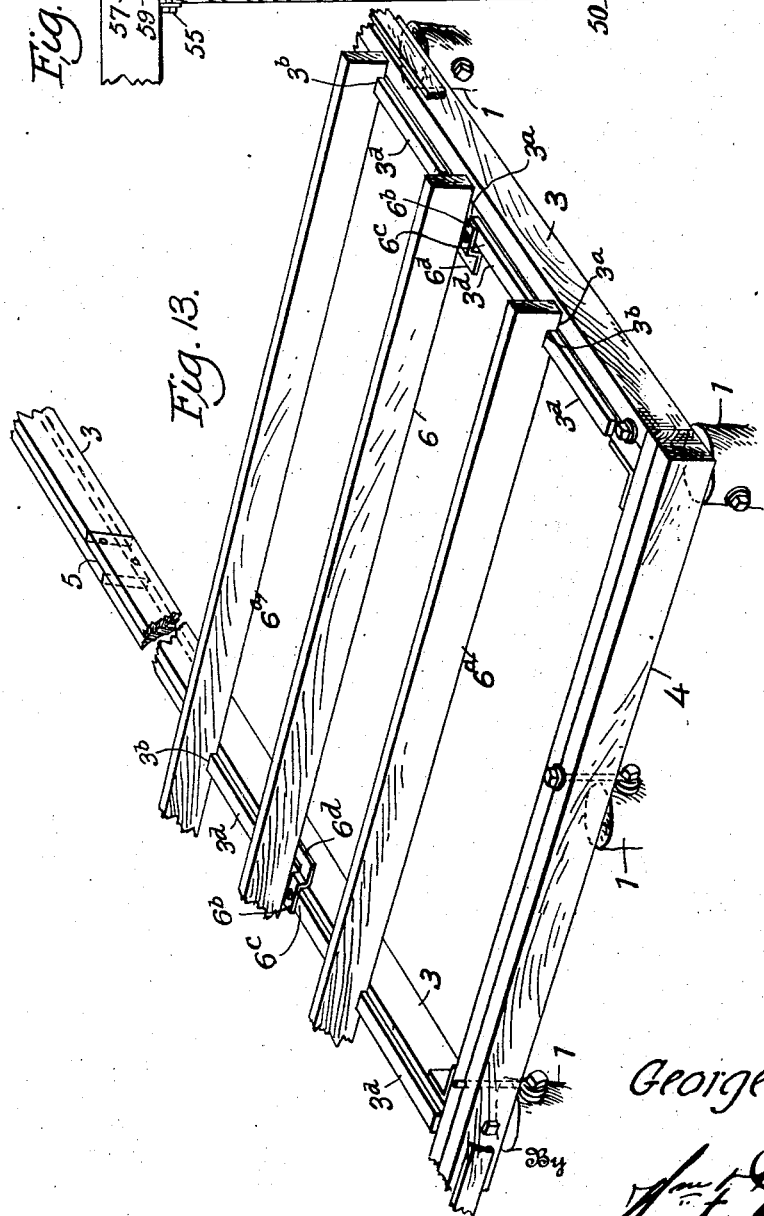
Inventor
George F. Hobson,
By
Attorney

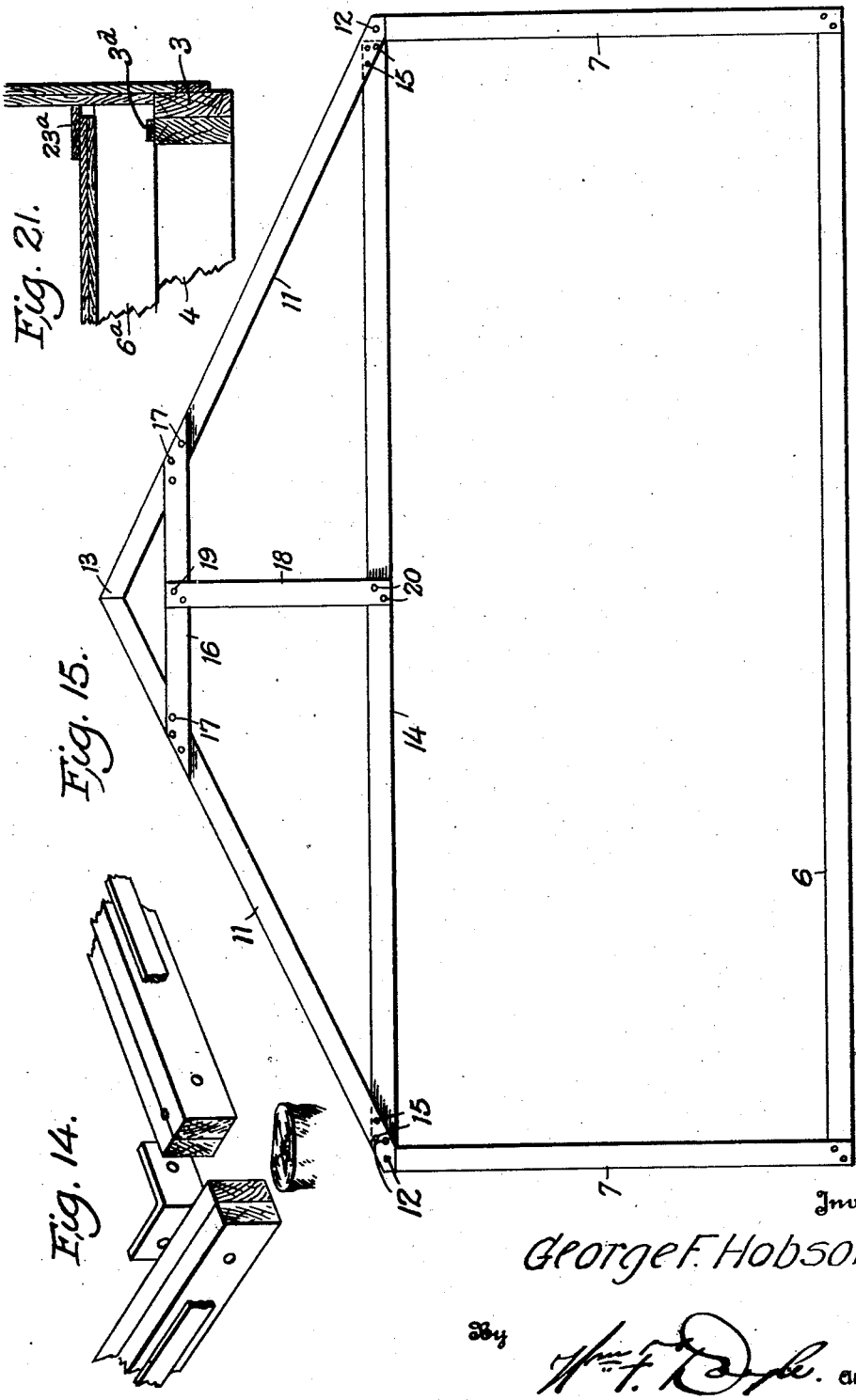

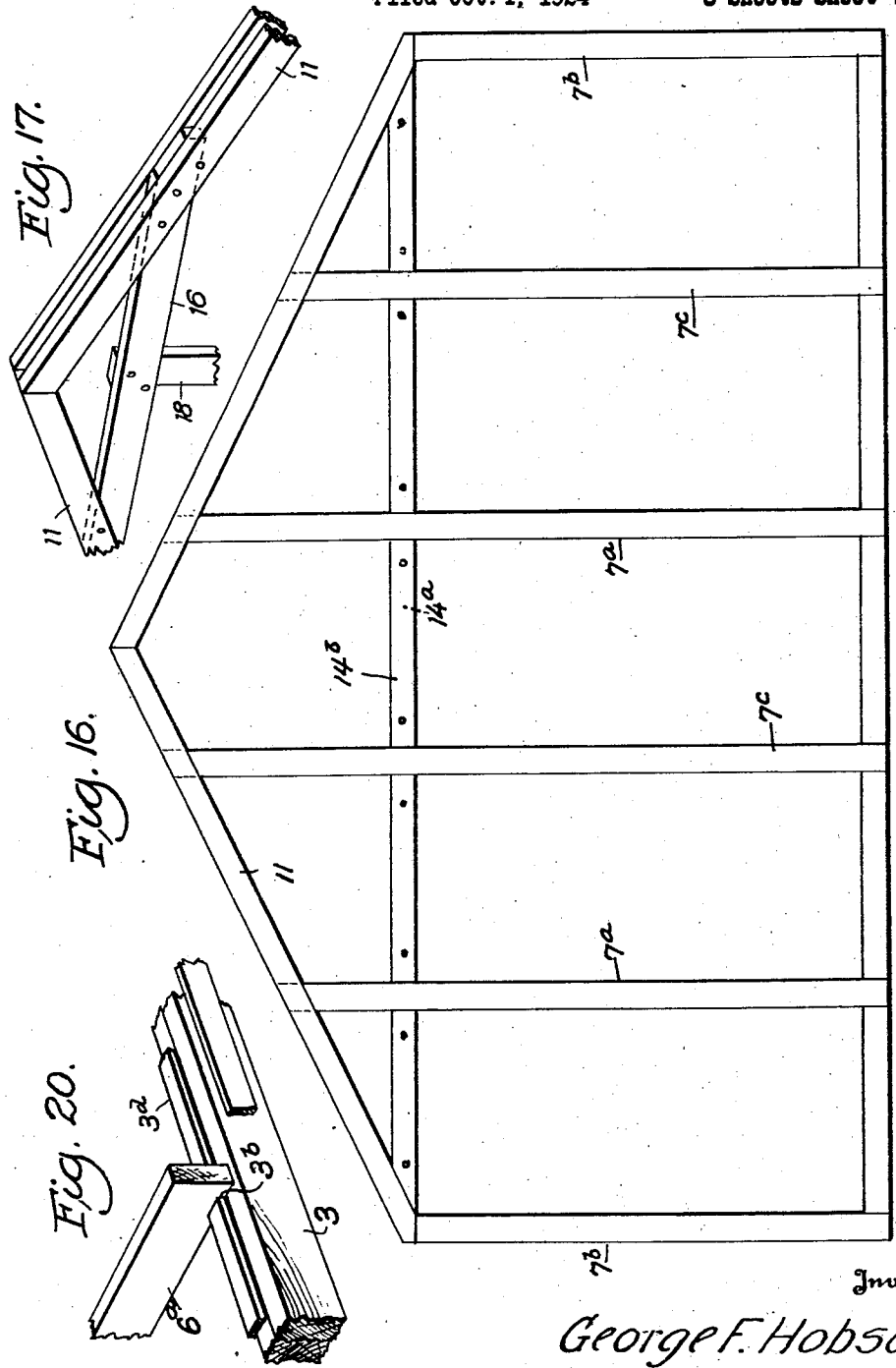

Patented June 12, 1928.

1,673,788

UNITED STATES PATENT OFFICE.

GEORGE F. HOBSON, OF THE UNITED STATES ARMY, WASHINGTON, DISTRICT OF COLUMBIA.

PORTABLE BUILDING.

Application filed October 1, 1924. Serial No. 741,050.

(GRANTED UNDER THE PROVISIONS OF THE ACT OF MARCH 3, 1883, 22 STAT. L., 625.)

The invention described herein may be manufactured and used by or for the Government for governmental purposes without payment to me of any royalty thereon.

This invention relates to a demountable and portable structure and more particularly to a demountable building usually of one story, especially adapted for Army use, wherein the structure is composed as nearly as possible of interchangeable and reversible units, each unit in turn consisting or made up of interchangeable and reversible parts.

In a structure of the character and for the purposes specified, the objects sought are simplicity, durability and economy.

One object being, therefore, to provide a structure of a simple character to enable its manufacture in the shortest space of time, thereby aiding in volume production, as well as to widen the field for production purposes, said simplicity of construction of the units and sub-units as well as in the erection operation, requiring relatively little expert knowledge and thereby permitting a more permiscuous selection of untrained assistants for the work.

Another object being durability, thus providing for the use of the structure over a long period in which the same may be constantly used as assembled or withstand numerous disassembling, transportation and assembling operations, with a minimum deterioration of the parts.

Another object being economy including absence of waste of wood in construction, time of labor, space in transportation, salvage value and the least number of units required to provide the greatest variety of structures representing the numerous types of buildings required for Army and other uses.

A further object being, after a careful study, of standard lumber obtainable in the United States and in foreign countries as to its length, width, thickness and character; the floor space and head room needed in buildings of this character, the ventilation and other hygienic problems to be met, due to the various climatic conditions in this and in foreign countries; the various buildings required, such as administration, officers' quarters, combined mess and quarters, officers' mess and school, barracks, combined kitchen and mess, combined administrative and recreation ward building, camp hospital, storehouse and stables, etc. relative to their capacity, dimensions, division and partitioning necessary for the various uses and many other conditions involved, to provide units of a form and construction, having the greatest common utility in the various buildings required, and to provide a construction in which the various types of buildings required would have the maximum number of corresponding parts which not only simplifies construction but reduces the variety and therefore, the volume of spare units to be constructed, stored and transported, when providing for maintenance, extension and replacement or repair work.

A further object being to avoid all peculiar or odd forms of joints, with the result that with very few exceptions all joints and cuts are square. Mortise joints of all forms are avoided wherever possible, and when necessary, are formed by offsetting of the parts, thus avoiding all auger, chisel, saw and other tool work, with its loss of time and material. Again, in no instance are the roof or exterior wall panels bored, their securing means being battens or overlapping strips, thereby, not only saving considerable time in construction but the avoidance of damage during erection and dismounting of said parts, and the difficulty of matching or alining the borings through which bolts would pass if such a method was used.

A further object being to provide a construction which may be progressively built in a manner to permit not only the simultaneous employment of a relatively large number of men on the work, but to avoid, as far as possible, any interference beteween the gangs of men employed on the different steps of the erection operation. Further the elimination of units of odd sizes and shapes and the adoption of those of an interchangeable, and in many instances, a reversible character; the adoption of securing means other than nails or the like, that cause damage to the parts; providing effective securing means with a minimum of borings; and the reduction as far as variety is concerned, in the tools necessary for erection purposes, a spanner wrench of one size only, being all that is necessary, and by diminishing the variety of tools, aiding in the solution of the equipment problem.

A further object being to provide a building that may be fabricated to a large degree in the shop, where such work is better and more rapidly accomplished, irrespective of weather or climatic conditions, said work being accomplished by the minimum of expert labor, in shops having the minimum equipment. Provision is further made for a building of a unitary construction that may be conveniently erected, added to, or reduced, in the minimum time, by unskilled labor, the parts of which will nest, in such a manner as to occupy the minimum space during transportation or in storage, and one that may be assembled in such a manner as to permit disassembling, with practically no loss of material or damage to the units or parts thereof.

Economy being further served in that the units and sub-units, and in fact, the entire structure and parts thereof call for lumber of standard stock lengths or divisions thereof, which enables the cutting of all parts without waste.

These and other objects will appear in the following description and be finally pointed out in the claims:

Similar numerals indicate corresponding parts in all the figures of the drawings in which:

Fig. 13 is a detail view of one end of a transverse sill and one intermediate sill, and a portion of the adjoining longitudinal sill section, showing joint between longitudinal, transverse and corner sills.

Fig. 14 shows details of separate members of sills.

Fig. 15 is a detail view of an intermediate frame assembled.

Fig. 16 is a similar view of an end frame complete.

Fig. 17 shows details of the separate members going to make up an intermediate frame.

Fig. 18 is an enlarged perspective view of the frame cluster at the eaves of roof.

Fig. 19 is a similar view of the parts at the base of one of the studs.

Fig. 20 is a perspective view of end of joist and its connection with sill.

Fig. 21 is a section through joist and floor lap.

Fig. 22 is a vertical section through a longitudinal partition to show shoe and cap.

Fig. 23 is a vertical section through a transverse partition.

Figure 1:
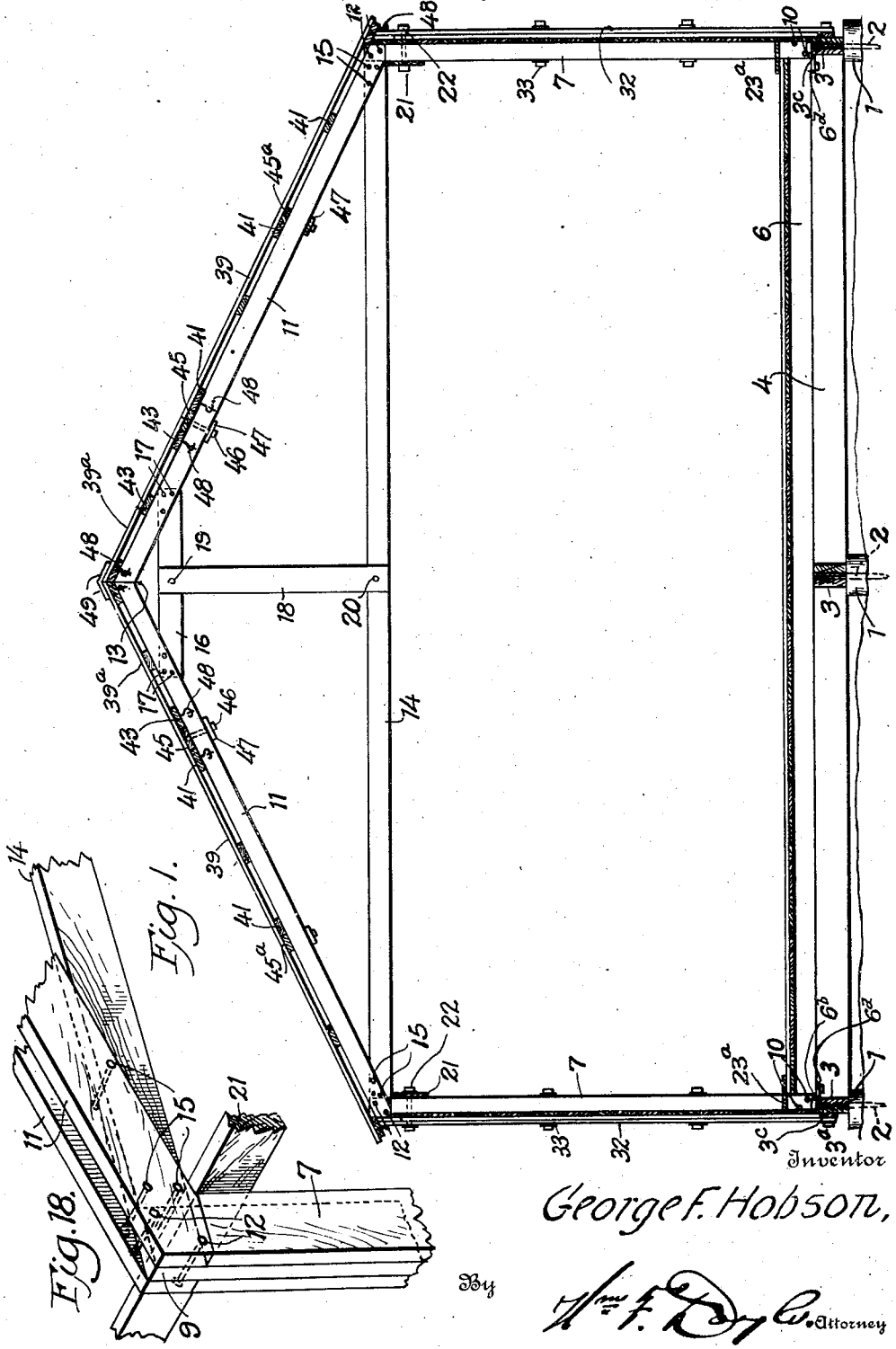
Fig. 1 is a vertical cross section of a demountable building embodying a preferred form of this invention.
Figure 2:
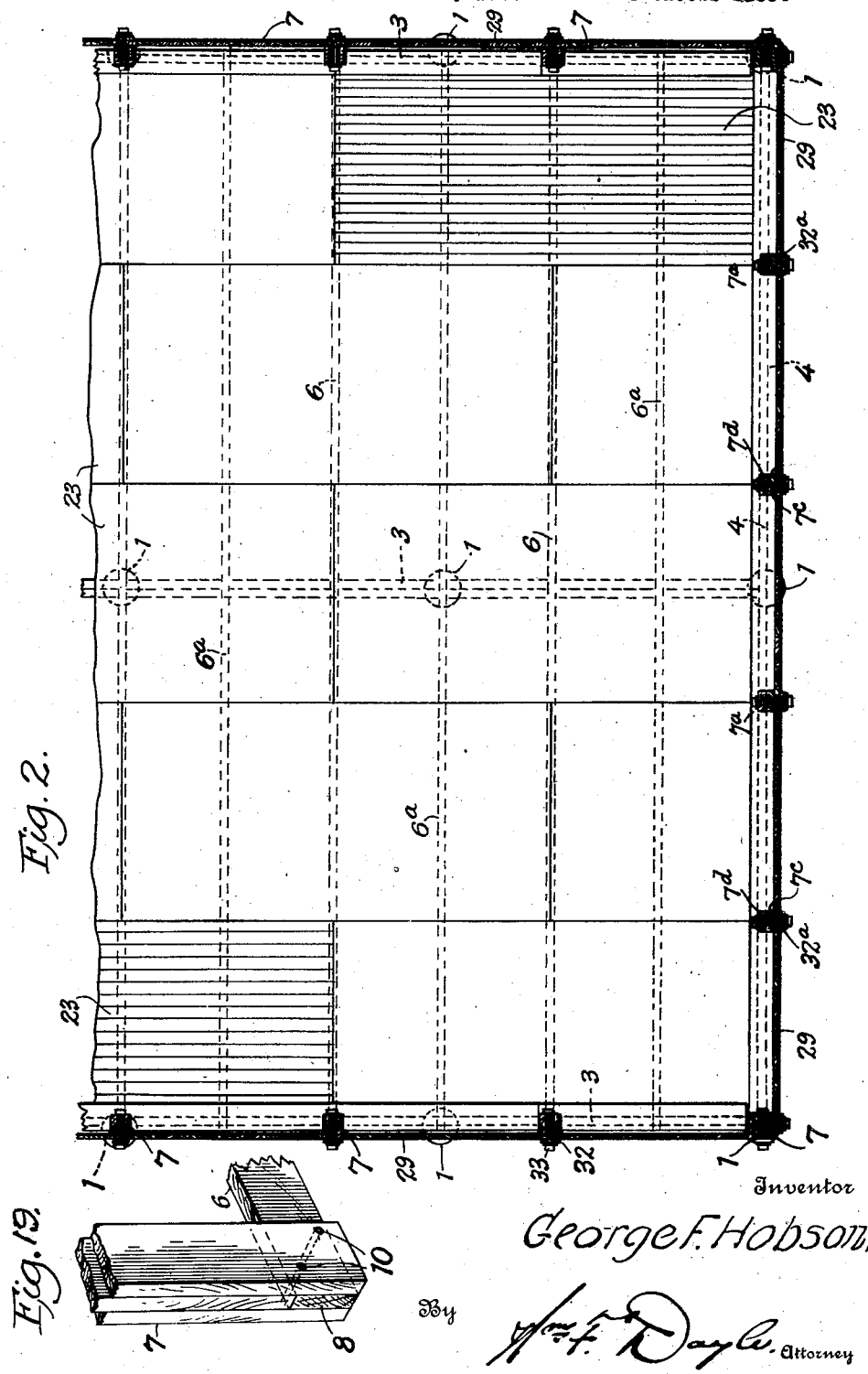
Fig. 2 is a horizontal section of a portion of same.
Figure 3:
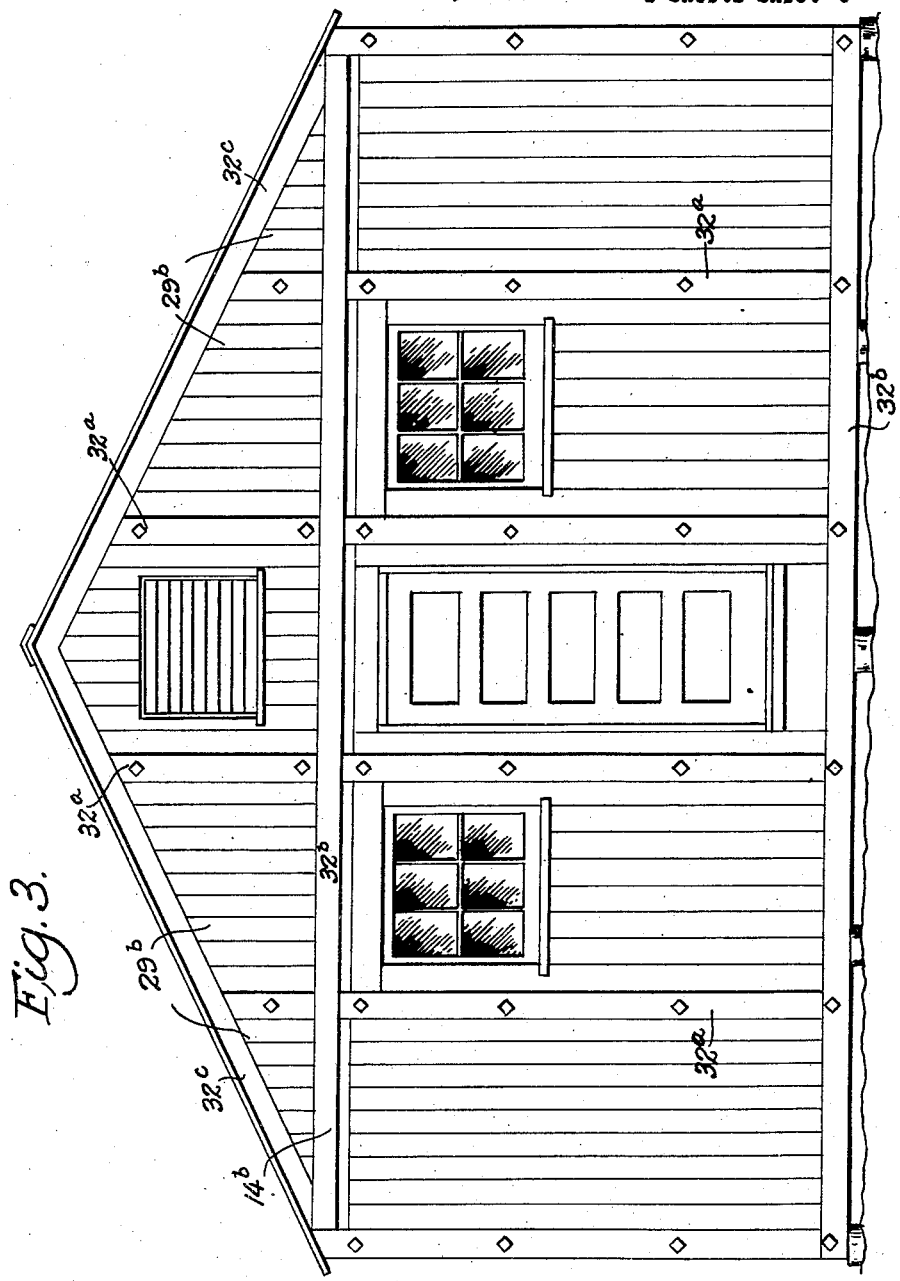
Fig. 3 is an end elevation of the completed structure.
Figure 4:
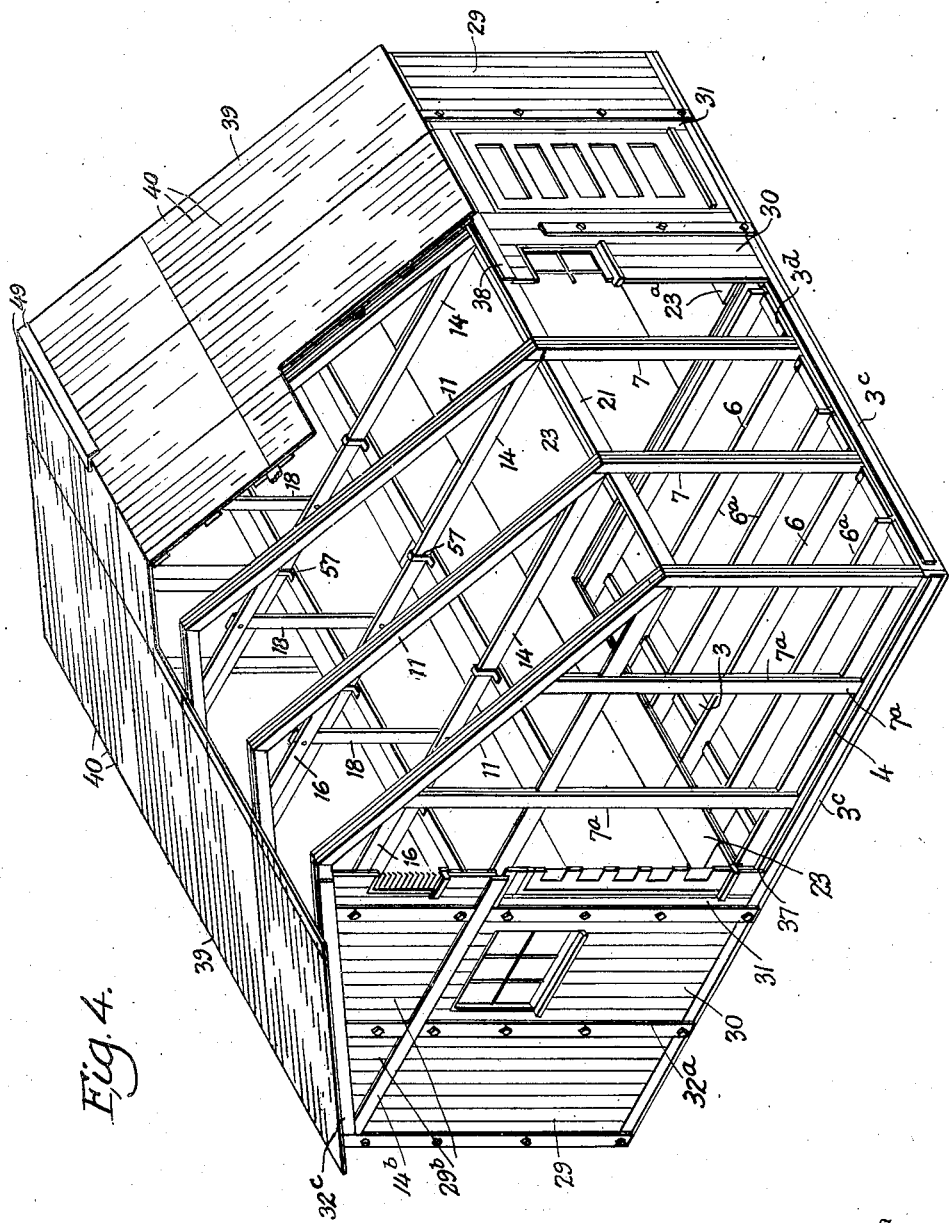
Fig. 4 is a perspective of the structure partly broken away.
Figure 5:
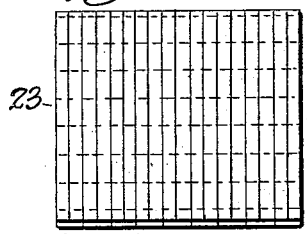
Fig. 5 is a face view of one length of floor panel.
Figure 7:
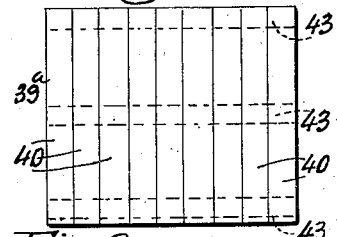
Fig. 7 is a face view of one length of roof panel.
Figure 9:
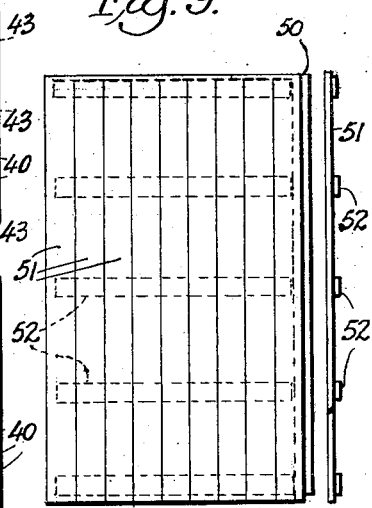
Fig. 9 is face and edge view of one form of partition panel.
Figure 6:
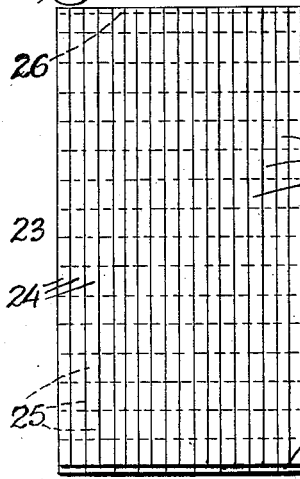
Fig. 6 shows a face and end view of another length of floor panel.
Figure 8:
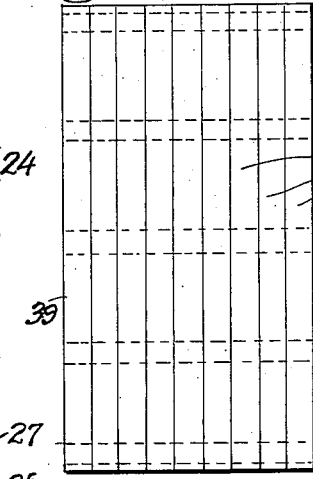
Fig. 8 is face and end view of another length of roof panel.
Figure 12:
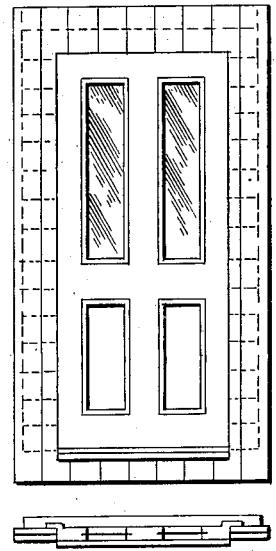
Fig. 12 shows face and end views of a door panel.
Figure 10:
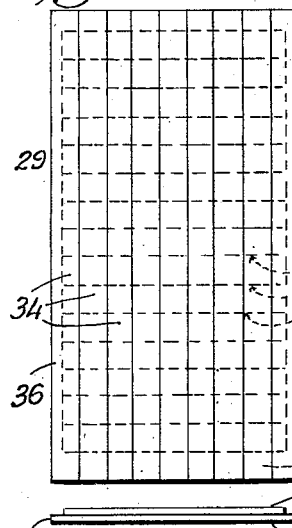
Fig. 10 shows face and end views of a solid exterior wall panel.
Figure 11:
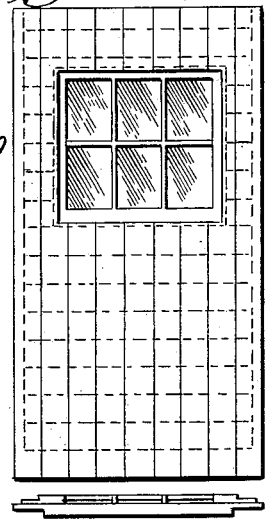
Fig. 11 shows face and end views of a window panel.

Reference now being had to the drawings by numerals, 1 indicates the foundation piles, which may be of any preferred material of approximately 6 inches in diameter, for instance, of wood driven or buried in the ground 3 or 4 feet and projecting a sufficient distance to permit the setting of the sills thereon, out of contact with the ground, a lag screw 2 of sufficient length usually passing through the sill into the foundation pile. Should cement piles be used, a bolt of the proper length is reversed, set in the upper end of the piles, and projects from the top of the pile a sufficient distance to extend up through the sill and on which a washer and nut may be threaded to securely anchor the sill to the pile.

The piles which are preferably arranged in rows of three on ten-foot centers, representing the width of the building, said rows being arranged on six-foot centers in the desired number as required in the length of the building, said building extending in length in units of twelve feet.

Resting on the piles and arranged longitudinally of the building are sills 3, cross sills 4 are arranged at the ends of the building. The end sills extend the full width of the building (20 feet) and are composed of two beams secured together. The longitudinal sills 3 are built up of two beams preferably in units of twelve-foot lengths, said beams being offset to provide a mortise 5 of approximately 3 inches at each end (see Fig. 13), thus providing beams of an interchangeable and reversible character having mortises at both ends.

The smallest building provided for is 20 x 12 feet, the longitudinal sill members being in twelve-foot units, providing for building units of twelve feet each.

The unit frames are fabricated prior to lifting into place, and consist of one twenty-foot joist 6 adapted to extend entirely across the building, projecting or extending vertically from either end of said joist are studs 7 built up, if preferred, of three 2 x 4 beams of equal length, the center one being upset the width of the joist 6 which is ordinarily six inches in width, thus providing a mortise 8 at the bottom and a tongue 9 at the top, of the studs. Said studs at their base being secured to the joist by bolts 10 passing through the joist and lower ends of the two outer members of the studs.

Secured at one end to the upper end of the studs are roof rafters 11 composed preferably of two 2 x 4 beams spaced apart the width of the tongue 9 at the upper end of the studs to which it is secured by bolts 12 and rests on the upper ends of the two side members of the studs, said roof rafters abutting end to end at the ridge of the roof at 13 and are spaced approximately two inches apart. Between the lower ends of said roof rafters is inserted a 2 x 6 tie beam 14, extending preferably entirely across the building, the upper edge of said tie beam being flush with the upper end of the tongue 9 of the stud, and is secured between the members of the roof rafters by bolts 15 passing through the members of the roof rafters and the intermediate end of the tie 14.

Arranged a short distance below the ridge of the roof is a 2 x 6 collar beam 16 inserted between the members of the roof rafter and secured to same by bolts 17.

Extending from the upper edge of the collar beam 16 to the lower edge of the tie beam 14 is a 2 x 4 hanger beam 18, which is bolted at its ends, as shown at 19 and 20, to the collar beam 16 and the tie beam 14 respectively.

The above described frame consists of a floor joist, two side studs, two roof beams, a tie beam, a collar beam, and a hanger beam, which are all cut, prepared and bored at the mill and shipped to the site for erection, said parts are fabricated at the site of the construction in horizontal position and then lifted into place on top of the sills at four-foot centers.

Arranged on top of the longitudinal sills and fabricated with same at the mill is a spacer member $3^d$, cut away to provide seats $3^a$ for the lower end of the studs at four-foot centers. Said spacer is also provided with cut away portions $3^b$ midway between cut away portions $3^a$ in which intermediate floor joists $6^a$ rest on the sills. Said member $3^d$ acting as a spacer between the floor joist 6 and $6^a$ which are placed on two-foot centers from one side to the other of the building.

At the time the sills are fabricated at the mill there is also secured to the outer face thereof a 1" x 4" strip $3^c$ running longitudinally of said sill member, thus providing a support on which the lower end of the exterior wall panels, may rest when placing and adjusting said panels into position.

Said unit frames are secured at their ends to the sills by wrought iron joist hangers $6^b$ so shaped as to rest on and be bolted to, the spacer at $6^c$ and extend beneath and be bolted to the joist as shown at $6^d$.

As the unit frames are adjusted into their vertical positions on the sills at four-foot centers, the upper ends thereof are spaced a corresponding distance apart and held by a ribbon board 21 approximately 1 x 6 inches extending along the inner face of the joist, just beneath the tie beams 14, said ribbon board being bolted through each stud as seen at 22. Said ribbon board is usually 12 feet long which represents the securing of 4 unit frames in place.

The floor panels 23 consist of units of approximately 4 x 8 feet composed of longitudinally extending standard floor boarding 24 and transversely extending dressed and matched boarding 25, said underlying board is of a length equal to the full width of the floor boarding 24 but stops short at one end 26 and overlaps at 27 at the other end, to provide a mortise joint as seen at 28, approximately one inch and a half over each joist 6 on which they lap and are secured by screws. Cover boards $23^a$ are secured around the outer edge of the flooring panels.

The floor panels 23 as well as roof panels, the latter being described later, are made in two lengths or 8 and 4 feet, it being understood that unit extensions or lengths of buildings are 12 feet in length by 20 feet in width, thus providing floor space that is a multiple of units of 8 x 4 foot lengths by 4 foot widths.

The exterior wall panels are made up in numerous forms such as solid panels 29, window panels 30, and door panels 31, all of which are of the same general dimensions 8 x 4 feet, and in their erection are stepped at their lower ends on the strip $3^c$ on the outer face of the sill and on said strip adjusted in line with the position they are to assume in relation to the studs and then pushed up into place and secured by battens 32 lapping the two adjoining ends of two panels which rest approximately one-half inch apart, the space between being occupied by the bolts 33 securing the battens to the stud.

The battens 32 extend from the upper edge of step piece or strip $3^c$ to the under face of the roof, and retain in place a removable strip, referred to later.

The exterior wall panels $29^a$ at the end of the building are the same dimensions as those used on the sides of the building or 4 x 8 feet. The exterior end wall panels or gable panels above the tie beam 14 as seen at $29^b$, are retained in place by vertical battens 32ª, horizontal battens 32ᵇ, and barge board 32ᶜ. The vertical battens 32ª extend above the horizontal batten 32ᵇ to the lower edge of the barge board 32ᶜ. Where the horizontal and vertical battens 32ª and 32ᵇ meet on a line with the tie beams 14, the horizontal battens extend through and the vertical battens are cut away, thus making the surfaces of the battens and the barge board 32ᶜ flush.

The exterior wall panels are constructed of outer vertically arranged boarding 34 approximately 1 x 6 and interior or inner transverse boarding 35 of any desired quality, the inner boarding being offset to provide a rabbet 36 along the vertical edge of the panels adapted to rest against the studs, and at its lower end the outer boarding extending down against the outer face of the sill as shown at 37 with the inner boarding resting on the top of the spacer member 3ª. The inner boarding 35 extends at its top to a point on a line with the lower edge of the tie beam 14. The height of the outer boarding 34 allows for a 1" x 6" strip or top board 38 temporarily secured in place and running longitudinally along at the top of said panels between the upper edges thereof and the lower face of the roof, thereby sealing the distance between said parts. Said board 38 in warm climates may, if preferred, be removed to provide for ventilation.

The roof, as stated above, is made in panels 39 and 39ª preferably 4' x 8' and 4' x 4' which are constructed of suitable boarding 40 running longitudinally or parallel with the rafters, having transverse battens preferably 2" x 4" arranged on approximately 2-foot centers. The boarding 40 extending slightly beyond the upper and lower battens. The upper or 4' x 4' panels 39ª of the roof have preferably 3 battens 43 running parallel with the battens 41.

Arranged longitudinally of the building and transversely to the unit frames 44 are purlins 45 and 45ª which are secured to the rafters, one at point of meeting of the roof panels 39 and 39ª, the other about midway between purlins 45 and the eaves of the roof, said purlins being secured by bolts 46 passing between the roof rafters and extending down through a wooden plate 47 beneath said rafters.

In the above construction the purline running from end to end of the building form braces and stops against which the roof battens on the roof panels come into contact, said roof panels being secured in place by any preferred means preferably hooks and eyes 48, the eyes being mounted in the rafters and the hooks on the roof panels, hooks and eyes or other securing means may be provided for attachment of the roof panels outside of the external wall panels. At the meeting of the upper edge or ridge of the roof panels, are arranged preferably 1" x 6" ridge boards 49 lapped to form a seal.

With the above construction we have an open unobstructed interior of a character suitable for general open storage purposes. Should on the other hand, it be desired that the structure be useful as officers' quarters, administrative building, or otherwise, partitions are provided and may be added to divide the interior in any desired manner, one of which will be described as follows:

The partition panels 50 are of the same dimensions as the panels for the floor, exterior walls and roof, and are 4' x 8', said partition panels being all identical, with the exception of slight differences between what are known as transverse and longitudinal partition panels, owing to the manner of securing same at their upper edges to either the tie beam or partition cap 53ª, and consist of vertical boarding 51 braced by cross battens 52. All of said internal panels rest in a shoe 53 secured to the floor which consists of a piece 2" x 4", having a groove 54 about ¾" x 1" into which the bottom edge of the partition panels are inserted. When the cross panels are thrown up into place after their being stepped into the groove of the shoe, they lap the tie beam 14 a sufficient distance, approximately 2 inches, to permit passing a bolt 55 through the panel and the tie beam to secure the panel in place. The longitudinal partition members, however, are about 2 inches shorter and are intended to clear the tie beams, and are adapted to be secured to the side of a partition cap 56 arranged along the under edge of the tie beams and is secured in place to the tie beams by metal straps 57 extending over the tie beam and provided with lateral extensions 58 through which bolts 59 pass down through the partition cap. The longitudinal partition panels are stepped in the shoe groove at their lower edges and are secured at their top edges to the cap strip by bolts. It will be understood that longitudinal and transverse partition panels are constructed of vertically arranged boarding secured by preferably 5 battens, said battens running transversely to the boarding and cut short allowing the boarding to project one inch beyond the ends of the battens on each side of the panels. Said partition panels 50 are provided with a permanently mounted batten board 60, projecting half its width beyond one edge of the panel which laps the adjoining panel and seals the joint therebetween. The edges of the panels are a sufficient distance apart, to permit the batten securing bolts 61 to pass between same.

As in the wall panels, the partition panels are also provided with doors where desired.

The ends of the building are framed in as follows:

The end intermediate studs 7$^a$, corner studs 7$^b$, tie beam 14$^a$, rafters, collar beam and hanger, are the same as in the intermediate frames with the exception that the tie beam consists of outer and inner beams. The intermediate studs 7$^a$ are of a two-member construction, the outer member 7$^c$ resting at its lower end on the sill 4 and extending up in a continuous piece above the tie beam 14$^a$ to the under edge of the roof rafters, and is cut on an angle corresponding with said edge. The inner member 7$^d$ of the stud extends from the upper edge of the floor joist to the lower edge of the tie beam and from the upper edge of said tie beam in a separate piece to the upper edge of and between the roof rafter and is cut at an angle corresponding with said edge. The inner members 7$^d$ of the studs are bolted to the outer member 7$^c$. Bolts extending through the studs and battens 32$^a$ secure the exterior wall panels in place.

The upper exterior end or gable panel members 29$^b$ are constructed in the same manner as the other panels, are secured in a corresponding manner and are cut to fit the pitch of the roof rafters. The exterior boards of said panels are adapted to rest against the outer face of the roof rafter. The outer surface of end tie beam rests within the outer surface of the roof rafter and to fill out and provide a surface against which the lower ends of the gable panels may rest, a filler piece 14$^b$ approximately 2 x 6 is secured to the outer face of the tie beam 14$^a$ said end tie beam with its filler piece may be fabricated at the mill, it being understood that the filler piece is cut away to allow for the outer member of the gable end studs.

Vertical battens 32$^a$ and horizontal battens 32$^b$ running parallel with the tie beam are located as described to retain the side edges and lower ends of the gable panels and the side edges and upper ends of the end panels in place. As a seal and finish at the upper surface of the gable panels a barge board approximately 1″ x 8″ is provided extending from the ends of the horizontal batten to the ridge. Said pieces being bolted to the end roof rafters and secures the upper ends of the gable panels in place.

It is noted that the door and window panels are all fabricated with the fragile parts within the dimensions of the panels to facilitate packing and to enable their transportation without danger of damage.

The transportation of separate small parts which require fitting is, as far as possible, avoided, and the fabrication of closely fitting parts and particular construction work is all done at the mill under the most advantageous conditions and not left to be completed at the site of building, thus avoiding the necessity for a large number and variety of tools, as well as as a high grade of labor, for erection work.

The roof may be covered if the period of time the building is to stand warrants it, by any suitable ready roofing or if the building is to be a more temporary character, the ordinary tar paper or rubberoid roofing may be employed.

If preferred, a sheet of building paper may be inserted between the boarding in the panels to act as a seal and exclude outside atmospheric conditions.

Having thus described my invention, what I claim as new and desire to secure by Letters Patent is:

1. A demountable building, constructed of lumber of standard lengths and standard length divisions thereof, comprised in combination with foundation piles, of fabricated side and end sills, means for removably securing the side and end sills together at their ends, means for removably securing the sills to the piles, spacer members, and side panel supports permanently mounted on the sills, unit intermediate and end frames each having wall studs, a floor joist, roof rafters and a tie beam, removably fabricated and adapted to rest on the sills between the spacers, floor joist hangers adapted to anchor the frames in place, intermediate wall studs arranged in the end frames, and floor, wall and roof panels of corresponding dimensions adapted to be removably secured to said unit frames for the purposes described.

2. A unitary demountable building, constructed of lumber of standard lengths and standard length divisions thereof, comprised in combination with foundation piles, of fabricated end and fabricated unitary side sills, means for removably securing the unitary side, and side and end sills together at their ends, means for removably securing the sills to the piles, spacer members, and side panel supports permanently mounted on the sills, unit intermediate and end frames each having wall studs, a floor joist, roof rafters and a tie beam, removably fabricated and adapted to rest on the sills between the spacers, floor joist hangers adapted to anchor the frames in place, intermediate wall studs arranged in the end frames, and floor, wall and roof panels of corresponding dimensions adapted to be removably secured to said unit frames for the purposes described.

3. A demountable building, constructed of lumber of standard lengths and standard length divisions thereof, comprised in combination with foundation piles, of fabricated side and end sills, means for removably securing the side and end sills together at their ends, consisting of abutting the squared end of the side sills against the side of the end sills and securing same in place by right angle brackets bolted through the sills, means for removably securing the sills to the piles, spacer members, and side panel supports permanently mounted on the sills, unit intermediate and end frames each having wall studs, a floor joist, roof rafters and a tie beam, removably fabricated and adapted to rest on the sills between the spacers, floor joist hangers adapted to anchor the frames in place, intermediate wall studs arranged in the end frames, and floor, wall and roof panels of corresponding dimensions adapted to be removably secured to said unit frames for the purposes described.

4. A demountable building, constructed of lumber of standard lengths and standard length divisions thereof, comprised in combination with foundation piles, of fabricated side and end sills, means for removably securing the side and end sills together at their ends, means for removably securing the sills to the piles, consisting of an anchor bolt mounted in the pile in line with the sill and projecting therefrom beneath the sill, a ring bolt extending through the sill and secured to the projecting anchor bolt, spacer members and side panel supports permanently mounted on the sills, unit intermediate and end frames each having wall studs, a floor joist, roof rafters and a tie beam, removably fabricated and adapted to rest on the sills between the spacers, floor joist hangers adapted to anchor the frames in place, intermediate wall studs arranged in the end frames, and floor, wall and roof panels of corresponding dimensions adapted to be removably secured to said unit frames for the purposes described.

5. A demountable building, constructed of lumber of standard lengths and standard length divisions thereof, comprised in combination with foundation piles, of fabricated side and end sills, means for removably securing the side and end sills together at their ends, means for removably securing the sills to the piles, spacer members and side panel supports permanently mounted on the sills, unit intermediate and end frames each having wall studs, a floor joist, roof rafters, and a tie beam, removably fabricated and adapted to rest on the sills between the spacers, floor joist hangers adapted to anchor the frames in place, consisting of metal brackets removably bolted at their ends at opposite sides of said joist on top of adjacent spacer strips and at their centers to the under edges of the joist, and floor, wall and roof panels of corresponding dimensions adapted to be removably secured to said unit frames for the purposes described.

6. A demountable building, consisting of side and end sills, unit frames arranged in spaced relation on the sills each having exterior wall studs, a floor joist connecting the lower ends of said studs, a tie beam connecting the upper ends of said studs, and roof rafters meeting to form a hip and secured as their outer ends to the ends of the tie beam and to the upper ends of the exterior wall studs, intermediate wall studs arranged in the end frames, floor, end, side and roof panels of corresponding dimensions adapted to be mounted on adjacent frames, and removable means for securing the panels in place.

7. A demountable building, consisting of side and end sills, intermediate and end unit frames, having studs at their ends, a floor joist connecting the lower ends of the studs, a tie beam connecting the upper ends of the studs and roof rafters meeting in a hip at the center and secured at their outer ends to the ends of the tie beam and to the upper ends of the studs, adapted to rest in spaced relation on the sills, correspondingly spaced studs extending from the floor joist to the roof rafters arranged in the ends frames, floor, wall and roof panels of corresponding dimensions adapted to be secured to adjacent unit frames and to the joist in the end unit members and battens secured to the unit frames between the panels to secure same in place.

8. A demountable building, comprised in combination with foundation piles, of fabricated side and end sills, means for detachably securing the sill members together and to the piles, spacer members and supporting strips permanently secured on the sills, demountably fabricated unit frames, each having a floor joist, exterior wall studs, secured to the ends of the floor joist, a tie beam connecting the upper ends of said studs, roof rafters secured together at the hip of the roof and secured at their outer ends to the adjacent ends of the tie beam and stud, said frames adapted to be stepped on the sills between the spacer members, ribbon boards arranged along the upper inner faces of the studs to secure the frames in spaced relation at their tops, and floor, wall and roof panels of corresponding dimensions adapted to be removably secured to adjacent frames.

9. A demountable building, comprised in combination with foundation piles of fabricated side and end sills, spacer members and supporting strips permanently secured on the sills demountably fabricated unit frames adapted to rest in spaced relation on the sill and ribbon board secured to the inner upper faces of the unit frames, said panels constructed of double thickness of lumber the inner thickness adapted to rest on the sill and between the studs of adjacent frames, the outer thickness adapted to rest on said supporting strips and means mounted in frames between the panels to secure the panels in place.

10. A demountable building, comprised in combination with foundation piles of fabricated side and end sills, spacer members and supporting strips permanently secured on the sills, demountable fabricated unit frames adapted to rest in spaced relation on the sill and ribbon board secured to the inner upper faces of the unit frames, side panels constructed of double thickness of lumber, the inner thickness adapted to rest on the sill and between the studs of adjacent frames, the outer thickness adapted to rest on said supporting strips, a top board removably mounted on the upper outer face of said panels and battens secured to the frames between the panels to retain the panels in place.

GEORGE F. HOBSON, Capt., Q. M. C.